UNITED STATES PATENT OFFICE.

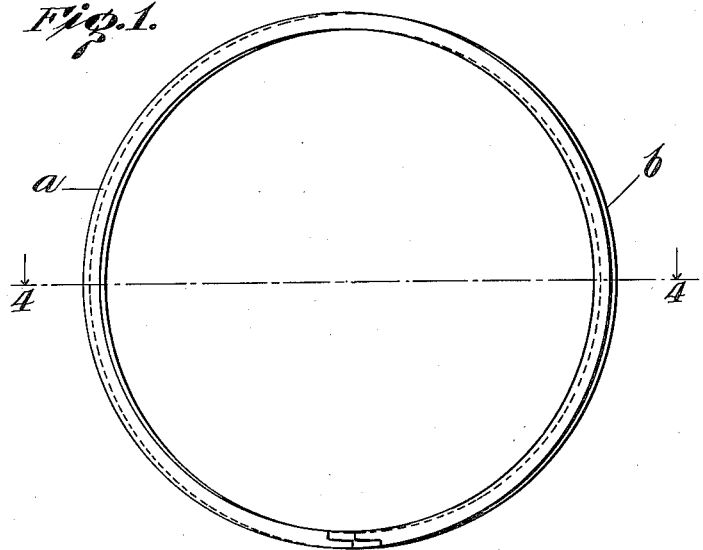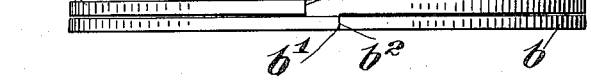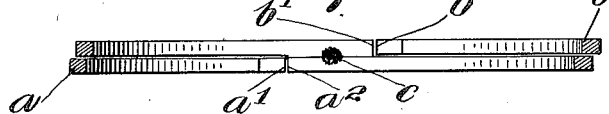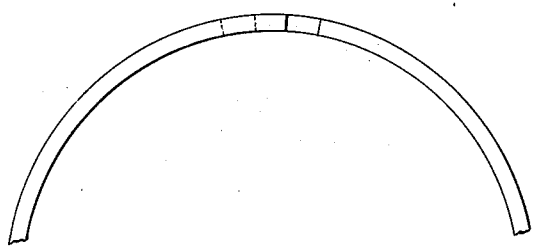

MILLARD L. DUNHAM, OF NEW YORK, N. Y.

PISTON-RING.

1,103,912.  Specification of Letters Patent.  Patented July 14, 1914.

Application filed November 3, 1913. Serial No. 798,637.

*To all whom it may concern:*

Be it known that I, MILLARD L. DUNHAM, a citizen of the United States, and resident of the borough of Manhattan, in the city, county, and State of New York, have invented certain new and useful Improvements in Piston-Rings, of which the following is a specification.

My invention relates to piston rings and the like and it refers particularly to devices of this character used in pistons of internal combustion motors and in cylinders where the high pressures which prevail are difficult to confine.

In brief my improvement comprises the employment of two separate rings, each divided at one point, where a lapping joint may be provided, these rings being placed side by side and united at a single point in their circumference.

In the drawing: Figure 1 is a plan view of my improved duplex ring; Fig. 2 is a side elevation thereof, expanded; Fig. 3 is a similar view, contracted; Fig. 4 is a sectional, side elevation on the line 4—4 of Fig. 2, and Fig. 5 is a partial detail view of the duplex ring without the lap joints.

The main purpose of my invention is to provide a duplex piston ring which may be of cast iron and which may contract to fit the cylinder, and which, as contracted, is of true cylindrical contour and forms a gas and pressure tight packing. To accomplish this purpose I make two rings of cast iron, as $a$, $b$, of equal dimensions. Ring $a$ may have abutting ends, recessed as at $a'$, $b^2$ to form a lap joint upon contraction of the ring, and ring $b$ may have abutting ends, recessed as at $b'$, $b^2$, for a similar reason.

In practice the rings $a$ $b$ are placed side by side, their circumferential relation being such that the outer recessed end $a'$ lies against the outer recessed end $b'$, and, at a point intermediate said ends $a'$ $b'$ the rings are connected, as by welding or otherwise. This point of connection is indicated in Fig. 4, as at $c$.

I have found in practice in the individual rings employed in the production of my improved duplex packing ring that a desirable method of producing said rings is by casting a tube of the desired diameter and wall thickness, and then cutting the ring members from said tube. Obviously the rings may be cast separately if desired, or produced in any other suitable manner whereby the elasticity of the material is secured. In producing the rings $a$ $b$, whether by casting or any other method they are formed of concentric contour. As connected, and in a free state, the rings $a$ $b$ are not in concentric planes, the free end of one ring lying slightly to one side of a medial line, through the joint, and the free end of the other ring lying slightly to the other side of the medial line. Thus the diameter in a line through the divided ends is less than the diameter in a line perpendicular thereto.

Contraction of the duplex ring to fit the cylinder for which intended serves to render the same concentric; also to lap the abutting recessed ends.

By reason of the stated arrangement of the rings $a$ $b$, side by side, and the connection between opposite side lapping ends thereof, the free portions of said rings, as stated, normally extend respectively in opposite directions beyond the contracted circumference or concentric contour of the duplex ring in expanded condition. By this arrangement the duplex ring, as contracted, exerts practically equal radial tension throughout its entire circumference, whereby in a large measure, the high efficiency of this device is attained.

Obviously I am not limited to the employment of the lap joint hereinbefore referred to and as seen in Fig. 5 the joint of the individual ring members may be of usual character though in relative fixed relation in the duplex ring corresponding to that illustrated in the other views.

I claim:

1. A piston packing comprising a pair of separate, split rings, arranged side by side, said rings being connected with each other at a point near and intermediate their respective joints.

2. A piston packing comprising a pair of separate, cast, split rings, arranged side by side, said rings being connected with each other at a point near and intermediate their respective joints.

3. A piston packing comprising a pair of separate, split rings, arranged side by side, the abutting ends of said rings being recessed for lap joints, and said rings being connected with each other at a point near and intermediate their respective lap joints.

4. A piston packing comprising a pair of separate, cast split rings, arranged side by side, the abutting ends of said rings being recessed for lap joints, and said rings being connected with each other at a point near and intermediate their respective lap joints.

5. A duplex packing ring comprising a pair of separate, cast, concentric split rings, arranged side by side, the abutting ends of said rings being recessed for lap joints, and said rings being connected with each other at a point near and intermediate their respective lap joints, the relative arrangement of said rings being such that their respective free ends, when unconfined, lie normally outside the concentric plane of the combined rings as contracted.

6. A duplex packing ring comprising a pair of separate, cast, concentric split rings, arranged side by side, the abutting ends of said rings forming joints, and said rings being connected with each other at a point near and intermedate their respective joints, the relative arrangement of said rings being such that their respective free ends, when unconfined, lie normally outside the concentric plane of the combined rings as contracted.

7. A duplex packing ring comprising a pair of separate, concentric split rings, arranged side by side, the abutting ends of said rings being recessed for lap joints, and said rings being connected with each other at a point near and intermediate their respective lap joints, the relative arrangement of said rings being such that their respective free ends, when unconfined, lie normally outside the concentric plane of the combined rings as contracted.

8. A duplex packing ring comprising a pair of separate, concentric split rings, arranged side by side, the abutting ends of said rings forming joints, and said rings being connected with each other at a point near and intermediate their respective joints, the relative arrangement of said rings being such that their respective free ends, when unconfined, lie normally outside the concentric plane of the combined rings as contracted.

Signed at the borough of Manhattan in the city, county and State of New York this 31st day of October A. D. 1913.

MILLARD L. DUNHAM.

Witnesses:
F. W. BARKER,
SADIE L. BLOCK.